United States Patent Office 3,510,558
Patented May 5, 1970

---

3,510,558
INSECTICIDAL COMPOSITION OF 5-BENZYL-3-FURYLMETHYL dl-CIS, TRANS - CHRYSANTHEMATE AND 3,4,5,6 - TETRAHYDROPHTHALIMIDOMETHYL dl-CIS, TRANS-CHRYSANTHEMATE
Keizo Hamuro, Nishinomiya-shi, Japan, assignor to Sumitomo Chemical Company, Ltd., Higashi-ku, Osaka, Japan, a corporation of Japan
No Drawing. Filed July 3, 1967, Ser. No. 650,660
Int. Cl. A01n 9/08
U.S. Cl. 424—274                                 1 Claim

ABSTRACT OF THE DISCLOSURE

An insecticidal composition of 5-benzyl-3-furylmethyl dl - cis, trans - chrysanthemate and 3,4,5,6 - tetrahydrophthalimidomethyl dl-cis, trans-chrysanthemate.

---

The present invention concerns with an insecticidal composition containing, as the essential active ingredient, a mixture of 5-benzyl-3-furylmethyl dl-cis, trans-chrysanthemate (hereinafter referred to as the compound No. 1) of the formula,

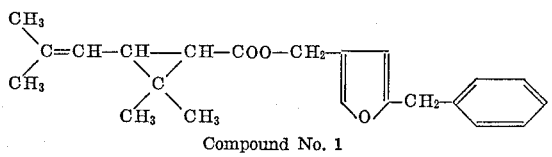

Compound No. 1 and 3,4,5,6-tetrahydrophthalimidomethyl dl - cis, trans-chrysanthemate (hereinafter referred to as the compound No. 2) of the formula,

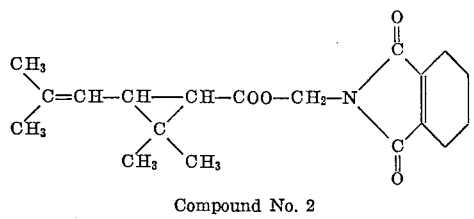

Compound No. 2

There have been desired insecticidal compositions having high insecticidal activity together with rapid knock-down effect (which means high in falling and overturning speed of insects) to household and agricultural insects and lack of mammalian toxicity.

There have been known that the chrysanthemic acid esters are employed in combination with organochlorine compound to enhance the killing effect on the insects. However, such combination possessed the defect that the characteristically advantageous propery of the low mammalian toxicity of the chrysanthemic acid esters disappear, because the organo-chlorine compound is more toxic to warm-blooded animals than the chrysanthemic acid esters.

The compound No. 2 is an insecticide showing very quick knock-down effect against the so-called hygienically noxious insects such as house-flies, mosquitoes, cockroaches and the like. The knock-down effect thereof is in the first rank among chrysanthemic acid esters including both natural and synthesized ones. However, the killing effect is not always strong when the compound No. 2 is used singly. On the one hand, the compound No. 1 similarly possesses strong insecticidal property against hygienically noxious insects, which is in the first rank among chrysanthemic acid esters and has a very low toxicity to warm-blooded animals. But, regrettably the compound No. 1 has such defect that knock-down effect thereof is very poor.

This invention is based on the discovery of the fact that when the compounds No. 1 and No. 2 are combined together the respective defects thereof are mutually compensated, and that the combination of two compounds result in a significant synergistic action in knock-down effect as well as killing effect.

One object of the present invention is to provide an insecticidal composition which can destroy harmful insects in the form of contact poison, gas poison or stomach poison.

Another object of the present invention is to provide an insecticidal composition which possesses low toxicity towards warm-blooded animals with increased insecticidal activity and rapid knock-down effect. Other objects will be apparent from the following descriptions.

For the preparation of the present insecticidal composition the compound No. 1 is admixed with the compound No. 2 in a broad range of weight ratio of between 0.5:9.5 and 9.5:0.5.

At any proportion of the active ingredients combined together the synergism thereof can be expected, but the proportion thereof varies depending on the object for use.

Especially surprising is that the effectiveness of the present compositions on insects remarkably exceeds the sum value of the effects of each constituent. By using the present composition, it is possible to significantly decrease the amount of the active component which is necessary for the complete kill of the insect, whereby at the same time, surprisingly rapid knock-down effects are displayed.

The following experiments are given to explain the synergisms between the compounds Nos. 1 and 2 combined together.

Experiment 1

With use of deodorized kerosene, there were prepared oil spray comprising singly of the compound No. 1 and compound No. 2 in respective amounts of 0.01% (the compound No. 1 only), 0.03%, 0.05%, 0.07% and 0.09% (the compound No. 2 only). Similarly, 0.1% oil spray was prepared, in which the compounds Nos. 1 and 2 have been combined together in the proportion of 1:9, 3:7, 5:5 and 7:3, respectively.

0.7 ml. each of thus obtained oil sprays were atomized respectively in a glass box of 70 x 70 x 70 cm. under 10 pound pressure with an atomizer. Knock-down of imagoes of house-flies lapsed 3 to 5 days after emergence placed in the glass box was observed with the lapse of time to measure the time required for 50% knock-down (the time thus required being designated at $KT_{50}$). The results of these experiments are shown in Table 1, which clearly

TABLE 1

| Oil spray containing compound No. 1 | | Oil spray containing compound No. 2 | | Mixed oil spray containing compounds Nos. 1 and 2 combined together | | |
|---|---|---|---|---|---|---|
| Concentration (percent) | $KT_{50}$ (second) | Concentration (percent) | $KT_{50}$ (second) | Mixing ratio (No. 1:No. 2) | Concentration (percent) | $KT_{50}$ (second) |
| 0.01 | >600 | 0.1 | 78 | | | |
| 0.03 | >600 | 0.09 | 83 | 1:9 | 0.1 | 67 |
| 0.05 | 453 | 0.07 | 96 | 3:7 | 0.1 | 83 |
| 0.07 | 352 | 0.05 | 107 | 5:5 | 0.1 | 91 |
| 0.1 | 310 | 0.03 | 172 | 7:3 | 0.1 | 130 | show the synergism between the two compounds in knockdown speed. Each value shown in Table 1 is an average obtained by repeating the experiments for 5 times.

Experiment 2

Oil spray of various concentrations comprising singly the compound No. 1 and the compound No. 2, and comprising the compounds Nos. 1 and 2 combined together in the proportion of 1:9, 3:7, 5:5 and 7:3 respectively, were prepared to measure their respective values of $LC_{50}$ (50% lethal concentration) by Campel's Turn Table Method [Soap and Sanitary Chemicals, vol. 14, No. 6, 119 (1938)]. Next, the theoretical values of $LC_{50}$ of oily agents in which the compounds Nos. 1 and 2 have been combined in an arbitrary proportion to display efficiency additionally were calculated by the method of Yun-Pei Sun et al. [J.E.E. 53 pp. 887–891 (1960)].

The obtained theoretical values and actual values measured as above are shown in Table 2. As is clear from Table 2, in any proportion of the compound No. 1 to the compound No. 2 the actual value measured is superior to the theoretical value, and therefore it is recognized that a considerable improvement is attained in lethal efficiency thereof.

TABLE 2

| Mixed oil spray containing compounds Nos. 1 and 2 combined together (No. 1:No. 2) | $LC_{50}$ (mg./100 ml.) | |
| --- | --- | --- |
| | Actual value measured | Theoretical value calculated |
| 0:10 | 120.0 | |
| 1:9 | 29.0 | 41.4 |
| 3:7 | 10.5 | 17.9 |
| 5:5 | 7.7 | 11.4 |
| 7:3 | 5.9 | 8.4 |
| 10:0 | 6.0 | |

Experiment 3

0.4% oil based aerosols and 0.4% water based aerosols comprising singly the compound No. 1 and the compound No. 2, respectively, were prepared. Further, 0.4% oil based aerosol and 0.4% water based aerosol comprising the compounds Nos. 1 and 2 combined together in the proportion of 1:1, respectively were prepared. These aerosols were atomized into Peet Gradys chambers in amounts of 650±50 mg., respectively, wherein knock-down and insecticidal effect thereof against imagoes of house-flies were observed.

The results were as shown in Table 3, from which the synergism between the two compounds has clearly been recognized.

TABLE 3

| Aerosol | Amount atomized (mg./ 6x6x6 ft.) | Knock-down (percent) | | | Knock-down mortality of insects (percent) |
| --- | --- | --- | --- | --- | --- |
| | | 5 min. | 10 min. | 15 min. | |
| Oil based containing compound No. 1 | 700 | 8.6 | 27.0 | 72.2 | 72.2 |
| Oil based containing compound No. 2 | 670 | 9.8 | 32.9 | 60.7 | 10.3 |
| Oil based containing compound No. 1 plus No. 2 | 680 | 15.8 | 68.9 | 93.5 | 93.5 |
| Water based containing compound No. 1 | 650 | 6.7 | 40.7 | 82.0 | 82.0 |
| Water based containing compound No. 2 | 625 | 10.5 | 50.3 | 73.9 | 8.4 |
| Water based containing compound No. 1 plus No. 2 | 625 | 19.9 | 75.0 | 96.0 | 96.0 |

Experiment 4

10% emulsions comprised singly of the compound No. 1 and the compound No. 2 and those comprising the compounds Nos. 1 and 2 combined together in the proportion of 1:9, 3:7, 5:5 and 7:3, respectively, were prepared and they were treated with distilled water to prepare sample solutions having various concentrations. 200 ml. of each of these sample solutions was placed in a beaker of 300 ml. capacity. Full grown larvae of northern house mosquitoes were placed in the beaker to examine insecticidal efficiency thereof. The values of $LC_{50}$ (50% lethal concentration) were as shown in Table 4.

The theoretical values of $LC_{50}$ of the combination of compounds Nos. 1 and 2 shown in Table 4 were obtained according to the method of Yun-Pei Sun et al. as in Experiment 2.

As is clear from the results shown in Table 4, in any proportion of the compound No. 1 to the compound No. 2, the actual value measured is superior to the theoretical value, from which a considerable improvement in lethal efficiency against larvae of northern house mosquitoes can be recognized.

TABLE 4

| Mixed emulsion containing compounds Nos. 1 and 2 combined together (No. 1:No. 2) | $LC_{50}$ (p.p.m.) | |
| --- | --- | --- |
| | Actual value measured | Theoretical value |
| 0:10 | 0.105 | |
| 1:9 | 0.055 | 0.068 |
| 3:7 | 0.029 | 0.036 |
| 5:5 | 0.020 | 0.025 |
| 7:3 | 0.011 | 0.017 |
| 10:0 | 0.012 | |

The control of insects by use of the present composition is effected according to the conventional procedure, for example by treating the objects to be protected with the present composition in the form of oil spray, dust, emulsion, aerosol, granules, wettable powder and bait which is preferably eaten by injurious insects or dust and solid agents inducing insecticidal effect in which an attractive substance is added, and other ordinary types of chrysanthemic acid ester insecticidal preparations. Furthermore, the present composition can readily be obtained by usual method for producing insecticide. Especially favorable results are yielded when present composition is employed as aerosol.

The present insecticidal compositions may be employed for knock-down and killing insects on a domestic or agricultural scale.

In controlling insects the present compositions are effective to various generation steps such as eggs, larvae, and adults of the injurious insects such as, for example, house-flies, mosquitoes, cockroaches and the like.

The following examples are given to illustrate the present invention more fully, but it is natural that the scope of the invention is not intended to be limited to these examples. Parts are by weight.

Example 1

1 part of the compound No. 1 and 9 parts of the compound No. 2 were homogeneously mixed together. 0.2 g. of the resultant mixture was dissolved in 99.8 g. of deodorized kerosene to obtain an oil spray.

Example 2

5 parts of the compound No. 1 and 5 parts of the compound No. 2 were homogeneously mixed together. 0.4 g. of the resultant mixture, 7.1 g. of xylene, and 7.5 g. of deodorized kerosene were mixed together and the resultant mixture was filled in an aerosol vessel. After fitting a valve portion thereon, 85 g. of a spraying agent (for instance, such as Freon, vinyl chloride monomer, liquefied petroleum gas or the like) was filled thereinto under pressure to obtain an aerosol.

Example 3

3 parts of the compound No. 1 and 7 parts of the compound No. 2 were homogeneously mixed together. 0.4 g. of the resultant mixture was mixed with 13.6 g. of deodorized kerosene and 1.0 g. of glycerol monooleate, an emulsifying agent, and the mixture was emulsified by adding 50 g. of pure water thereto. The emulsion was filled into an aerosol vessel together with 35 g. of a mixture of 3:1 of deodorized butane and deodorized propane to obtain a water based aerosol.

Example 4

7 parts of the compound No. 1 and 3 parts of the compound No. 2 were homogeneously mixed together. 20 g. of the resultant mixture, 25 g. of Sorpol 2020 (registered trade name of the product produced by Toho Kagakusha) and 55 g. of xylene were mixed in this order to obtain a homogeneous emulsifiable concentrate.

Example 5

5 parts of the compound No. 1 and 5 parts of the compound No. 2 were homogeneously mixed together. To 50 g. of the resultant mixture, 1.5 g. of a higher alcohol sulfuric acid ester and 3.5 g. of lignin were added and thoroughly mixed together. 45 g. of diatomaceous earth was added to the resultant mixture and thoroughly with stirring in a smasher to obtain a wettable powder.

Example 6

2 parts of the compound No. 1 and 8 parts of the compound No. 2 were homogeneously mixed together. 1 g. of the resultant mixture was dissolved in 30 ml. of acetone and 99 g. of diatomaceous earth passing through 300 mesh screen was added thereto. The resultant mixture was sufficiently stirred and kneaded in a mortar, and then the acetone was removed by evaporation to obtain a powdery agent.

Test Example 1

About 20 house-fly adults were liberated in a 70 cm. x 70 cm. x 70 cm. glass chamber. Into the chamber, 0.7 ml. of the oil spray formulated according to Example 1 was uniformly sprayed under 10 lb. per in. by means of a glass atomizer. Thereafter, the number of knocked-down house-flies was observed with time. After 10 minutes, the knocked-down house-flies were collected and transferred into a clean cage and, on the next day, the life and death thereof were observed. The results were as shown in Table 5.

TABLE 5

| Insecticidal composition | Knock-down, percent at elapsed time | | | | | | | | | Knock-down mortality (percent) |
|---|---|---|---|---|---|---|---|---|---|---|
| | 38" | 53" | 1'15" | 1'45" | 2'30" | 3'30" | 5' | 7' | 10' | |
| Oil spray of Example 1 | 48.8 | 71.8 | 88.7 | 96.9 | 100 | 100 | 100 | 100 | 100 | 100 |
| 0.2% Pyrethrins oil spray | 25.2 | 57.7 | 73.1 | 88.6 | 93.7 | 97.9 | 100 | 100 | 58.6 | 58.6 |

Test Example 2

A plastic Petri dish of 14 cm. in inner diameter and 7 cm. in height was covered at the bottom with wire net. 10 smoky brown cockroach adults were put into the Petri dish. Subsequently, the Petri dish was covered also at the top with wire net. The Petri dish was connected beneath the glass cylinder of Nagasawa's mist settling apparatus (Sumio Nagasawa: "Brochū Kagaku," vol. 18, pages 183–192, 1953). From the top of the glass cylinder apparatus, each of the aerosols formulated according to Examples 2 and 3 was sprayed directly to the cockroaches. After spraying the aerosol, the number of knocked-down insects was observed with time. After 20 minutes, the cockroaches were transferred into a clean cage and were fed and, 3 days later, the life and death thereof were observed. The results were shown as in Table 6.

TABLE 6

| Insecticidal composition | Avg. dose (mg.) | Knock-down, percent at elapsed time | | | | | | Mortality (percent) |
|---|---|---|---|---|---|---|---|---|
| | | 2'30" | 5' | 7' | 10' | 15' | 20' | |
| Aerosol of Example 2 | 450 | 40.0 | 60.0 | 75.0 | 95.0 | 100 | 100 | 100 |
| Aerosol of Example 3 | 500 | 25.0 | 50.0 | 65.0 | 80.0 | 95.0 | 100 | 100 |
| OTA * | 475 | 25.0 | 35.0 | 55.0 | 60.0 | 65.0 | 90.0 | 80.0 |

* OTA (Official Test Aerosol). Official Test Aerosol of the Chemical Specialties Manufacturers Association of America.

Test Example 3

An emulsion prepared by diluting with water to 200 times the emulsifiable concentrate formulated according to Example 4, and an emulsion prepared by diluting with water to 500 times the wettable powder formulated according to Example 5, were individually dropped by means of a pipette on the surface of a 15 cm. x 15 cm. plywood so that the proportion of the emulsion on said surface became evenly 5 ml./m.$^2$. After air-drying, 20 house-fly adults, which had been liberated in a wire net (9 cm. dia., 1 cm. high) were made to contact with the treated surface, and the number of knocked-down house-flies was observed with time. After 30 minutes' contact, the house-flies were transferred to a rearing cage and were fed and, on the next day, the life and death of the house-flies were observed. The results were as shown in Table 7.

TABLE 7

| Insecticidal composition | Knock-down, percent at elapsed time | | | | | | | Mortality (percent) |
|---|---|---|---|---|---|---|---|---|
| | 2'30" | 5' | 7' | 10' | 15' | 20' | 30' | |
| 200 times-diluted solution of emulsifiable concentration of Example 4. | 5.0 | 36.9 | 88.0 | 97.5 | 100 | 100 | 100 | 100 |
| 500 times-diluted solution of wettable powder of Example 5. | 10.0 | 72.5 | 100 | 100 | 100 | 100 | 100 | 100 |
| 0.1% Pyrethrins emulsion | 0 | 1.7 | 31.7 | 75.0 | 85.0 | 91.7 | 98.3 | 18.3 |

Test Example 4

A Petri dish of 14 cm. in inner diameter and 7 cm. in height was coated on the inner wall with butter, leaving at the lower part of the wall an uncoated area of about 1 cm. in height. On the bottom of the dish, a dust formulated according to Example 6 was uniformly sprinkled. 10 German cockroach adults were put into the dish to be contacted with the dust, and the number of knocked-down cockroaches was observed with time. After 10 minutes, the cockroaches were taken out and were transferred into a new vessel and, 3 days later, the life and death of the insects were observed. The results were as shown in Table 8.

TABLE 8

| Insecticidal composition | Knock-down, percent at elapsed time | | | | Mortaility (percent) |
|---|---|---|---|---|---|
| | 1'15" | 2'30" | 5' | 10' | |
| Dust of Example 6 | 85.0 | 100 | 100 | 100 | 100 |

What is claimed is:
1. An insecticidal composition comprising as the essential active ingredient, a toxic amount of a mixture of 5-benzyl - 3 - furylmethyl dl-cis, trans-chrysanthemate and 3,4,5,6-tetrahydrophthalimidomethyl dl-cis, trans-chrysan- themate, in a ratio of between about 0.5:9.5 and about 9.5:0.5.

References Cited

Elliott: Nature, vol. 213, pp. 493, 494 (Feb. 4, 1967).
Chemical Abstracts: vol. 63, p. 5, 690.

ALBERT T. MEYERS, Primary Examiner
S. J. FRIEDMAN, Assistant Examiner

U.S. Cl. X.R.
424—285

Notice of Adverse Decision in Interference

In Interference No. 98,813 involving Patent No. 3,510,558, K. Hamuro, INSECTICIDAL COMPOSITION OF 5-BENZYL-3-FURYLMETHYL dl-CIS, TRANSCHRYSANTHEMATE AND 3,4,5,6-TETRAHYDRO-PHTHALIMIDOMETHYL dl-CIS, TRANS-CHRYSANTHEMATE, final judgment adverse to the patentee was rendered Mar. 19, 1976, as to claim 1.

[*Official Gazette June 22, 1976.*]